US012665969B2

(12) United States Patent
Pat et al.

(10) Patent No.: US 12,665,969 B2
(45) Date of Patent: Jun. 23, 2026

(54) TECHNOLOGIES FOR GENERATING OPTIMIZED EVENT SEQUENCE INDICES FOR REAL-TIME EVENT FLOW VISUALIZATIONS AND ANALYTICS

(71) Applicant: Genesys Cloud Services, Inc., Menlo Park, CA (US)

(72) Inventors: Ankit Pat, Menlo Park, CA (US); Maciej Dabrowski, Galway (IE)

(73) Assignee: Genesys Cloud Services, Inc., Menlo Park, CA (US)

( * ) Notice: Subject to any disclaimer, the term of this patent is extended or adjusted under 35 U.S.C. 154(b) by 153 days.

(21) Appl. No.: 18/790,531

(22) Filed: Jul. 31, 2024

(65) Prior Publication Data

US 2026/0039752 A1 Feb. 5, 2026

(51) Int. Cl.
*H04M 3/51* (2006.01)

(52) U.S. Cl.
CPC ................................. *H04M 3/5175* (2013.01)

(58) Field of Classification Search
CPC .................................................. H04M 3/5175
See application file for complete search history.

(56) References Cited

U.S. PATENT DOCUMENTS

2015/0039574 A1* 2/2015 Dubey .................. G06F 16/319
707/695
2023/0038616 A1* 2/2023 Hopcroft ............... G06F 16/316

2023/0050135 A1 2/2023 Thiel
2023/0334034 A1* 10/2023 Murgai ............... H04M 3/2218

OTHER PUBLICATIONS

Gang Luo et al: "Resource-adaptive real-time new event detection", Proceedings of the ACM Sigmod International Conference on Management of Data, Beijing, China, Jun. 12-14, 2007, ACM, 2 Penn Plaza, Suite 701, New York, NY 10121-0701 USA, Jun. 11, 2007, pp. 497-508, XP058380077, DOI: 10.1145/1247480.1247536 ISBN: 978-1-59593-686-8.

(Continued)

*Primary Examiner* — Phung-Hoang J Nguyen
(74) *Attorney, Agent, or Firm* — Taft Stettinius & Hollister LLP

(57) ABSTRACT

A method for generating an inverted search index for event sequence visualization may include determining, from an event sequence dataset containing event sequences and events, event pair combinations based on identified unique singleton events. The method may further include establishing a positional ordering for each singleton event and each event pair combination and generating a respective event sequence set for each event sequence. The method may also include determining whether each unique singleton event and each event pair combination exists or does not exist within each event sequence, and populating, for each respective event sequence set and according to the positional ordering, data indicative of whether each unique singleton event and each event pair combination exists or does not exist within the event sequence for the respective event sequence set. The method may also include generating the inverted search index including each respective event sequence set for each event sequence.

8 Claims, 11 Drawing Sheets

(56) References Cited

OTHER PUBLICATIONS

International Search Report and Written Opinion of the ISA, mailed Oct. 6, 2025 for related International application PCT/2025/039270, filed Jul. 25, 2025, which claims priority to the instant application.

Sanghvi, Y.; A Simple Guide to Sequence Pattern Mining: Types & 4 Algorithms; May 19, 2022; retrieved from the Internet Jul. 29, 2024; available at https://hevodata.com/learn/sequence-pattern-mining/.

Kadioğlu, S et al.; Seq2Pat: Sequence-to-pattern generation to bridge pattern mining with machine learning; AI Magazine; 2023; pp. 54-66; vol. 44; available at https://onlinelibrary.wiley.com/doi/epdf/10.1002/aaai.12081/.

Hosseininasab, A. et al.; Constraint-Based Sequential Pattern Mining with Decision Diagrams; Proceedings of The Thirty-Third AAAI Conference on Artificial Intelligence (AAAI-19); 2019; pp. 1495-1502; available at https://ojs.aaai.org/index.php/AAAI/article/view/3962/3840.

Fidelity Investments et al.; Seq2Pat: Sequence-to-Pattern Generation Library "README.md"; May 31, 2024; retrieved from the Internet Jul. 29, 2024; available at https://github.com/fidelity/seq2pat/blob/master/README.md.

Gyacsok, A.; sequence-mining 0.0.3: Sequence mining SPAM algorithm implementation; Sep. 20, 2022; retrieved from the Internet Jul. 29, 2024; available at https://pypi.org/project/sequence-mining/.

Gao, C.; prefixspan 0.5.2: PrefixSpan, BIDE, and FEAT in Python 3; Sep. 29, 2018; retrieved from the Internet Jul. 29, 2024; available at https://pypi.org/project/prefixspan/.

Wikipedia; Silhouette (clustering); Jul. 1, 2024; retrieved from the Internet Jul. 29, 2024; available at https://en.wikipedia.org/wiki/Silhouette_(clustering).

Pascoe, A.; HyperLogLog and MinHash; Jul. 10, 2013; retrieved from the Internet Jul. 29, 2024; available at https://tech.nextroll.com/blog/data/2013/07/10/hll-minhash.html.

Gupta, U.; Probabilistic Data Structures: Part 2; Sep. 6, 2023; retrieved from the Internet Jul. 29, 2024; available at https://www.linkedin.com/pulse/probabilistic-data-structures-part-2-ujjwal-gupta.

Burroughs, S.; B+Tree Basics; Mar. 18, 2016; retrieved from the Internet Jul. 29, 2024; available at https://www.youtube.com/watch?v=49P_GDeMDRo.

Burroughs, S.; B+Tree Deletions; Mar. 18, 2016; retrieved from the Internet Jul. 29, 2024; available at https://www.youtube.com/watch?v=QrbaQDSuxIM.

Fisher, D.; B+ Tree Basics 1; Mar. 23, 2013; retrieved from the Internet Jul. 29, 2024; available at https://www.youtube.com/watch?v=CYKRMz8yzVU.

* cited by examiner

300

Figure 6:
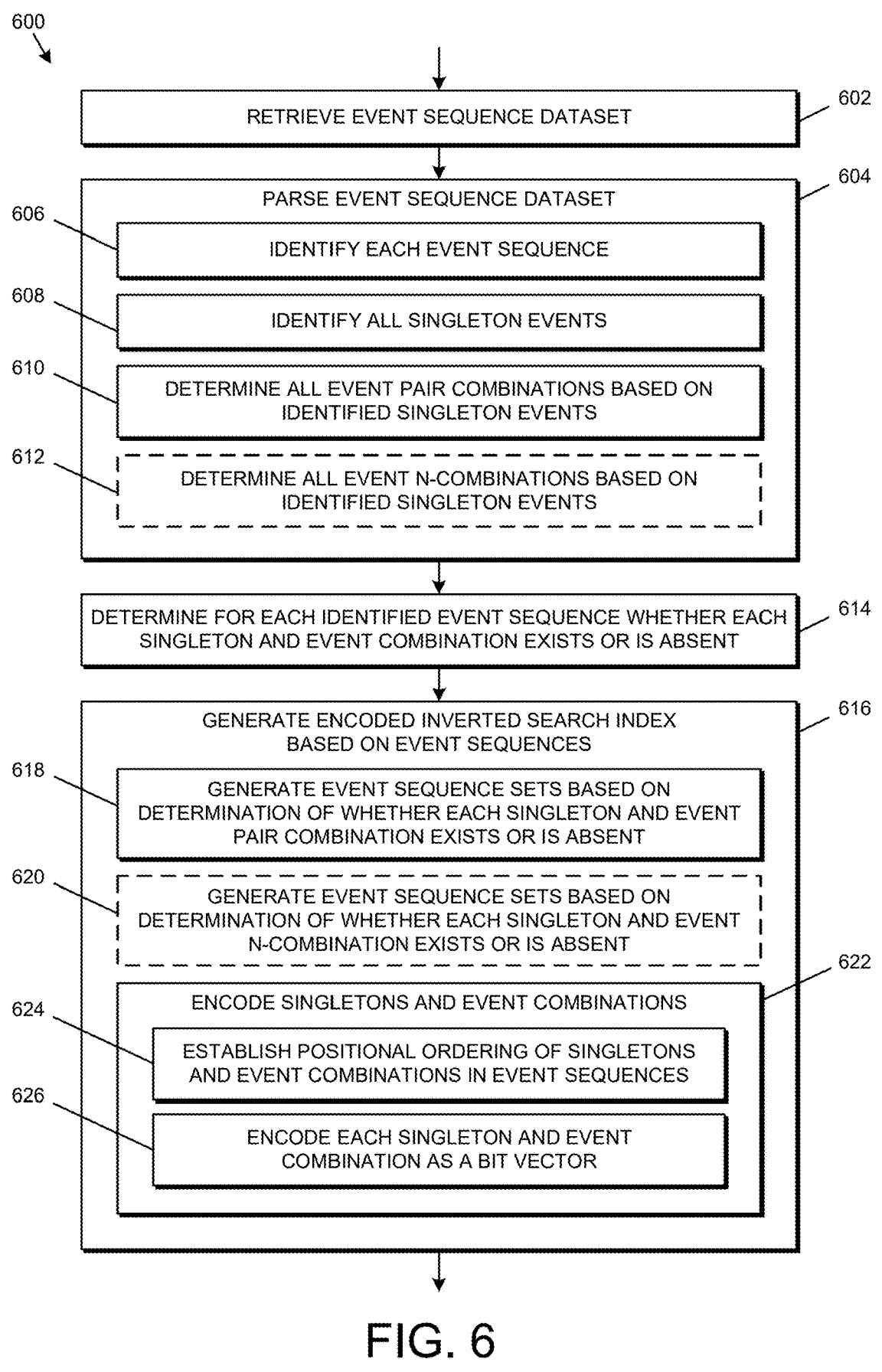

600

602
RETRIEVE EVENT SEQUENCE DATASET

604
PARSE EVENT SEQUENCE DATASET

606
IDENTIFY EACH EVENT SEQUENCE

608
IDENTIFY ALL SINGLETON EVENTS

610
DETERMINE ALL EVENT PAIR COMBINATIONS BASED ON IDENTIFIED SINGLETON EVENTS

612
DETERMINE ALL EVENT N-COMBINATIONS BASED ON IDENTIFIED SINGLETON EVENTS

614
DETERMINE FOR EACH IDENTIFIED EVENT SEQUENCE WHETHER EACH SINGLETON AND EVENT COMBINATION EXISTS OR IS ABSENT

616
GENERATE ENCODED INVERTED SEARCH INDEX BASED ON EVENT SEQUENCES

618
GENERATE EVENT SEQUENCE SETS BASED ON DETERMINATION OF WHETHER EACH SINGLETON AND EVENT PAIR COMBINATION EXISTS OR IS ABSENT

620
GENERATE EVENT SEQUENCE SETS BASED ON DETERMINATION OF WHETHER EACH SINGLETON AND EVENT N-COMBINATION EXISTS OR IS ABSENT

622
ENCODE SINGLETONS AND EVENT COMBINATIONS

624
ESTABLISH POSITIONAL ORDERING OF SINGLETONS AND EVENT COMBINATIONS IN EVENT SEQUENCES

626
ENCODE EACH SINGLETON AND EVENT COMBINATION AS A BIT VECTOR

|  | ES_1 | ES_2 | ES_3 | ES_4 | ES_5 |
|---|---|---|---|---|---|
| A | 1 | 1 | 1 | 0 | 1 |
| B | 1 | 1 | 0 | 1 | 1 |
| C | 1 | 0 | 1 | 1 | 1 |
| (A,B) | 1 | 1 | 0 | 0 | 1 |
| (A,C) | 1 | 0 | 1 | 0 | 1 |
| (B,C) | 1 | 0 | 0 | 0 | 0 |
| (A,A) | 0 | 1 | 0 | 0 | 1 |
| (B,A) | 0 | 1 | 0 | 0 | 1 |
| (C,B) | 0 | 0 | 0 | 1 | 1 |
| (C,A) | 0 | 0 | 0 | 0 | 1 |

| | A | B | C | (A,A) | (B,B) | (C,C) | (A,B) | (A,C) | (B,A) | (B,C) | (C,A) | (C,B) |
|---|---|---|---|---|---|---|---|---|---|---|---|---|
| ESS_1 | 1 | 1 | 1 | 0 | 0 | 0 | 1 | 1 | 0 | 1 | 0 | 0 |
| ESS_2 | 1 | 1 | 0 | 1 | 0 | 0 | 1 | 0 | 1 | 0 | 0 | 0 |
| ESS_3 | 1 | 0 | 1 | 0 | 0 | 0 | 0 | 1 | 0 | 0 | 0 | 0 |
| ESS_4 | 0 | 1 | 1 | 0 | 0 | 0 | 0 | 0 | 1 | 0 | 0 | 1 |
| ESS_5 | 1 | 1 | 1 | 1 | 0 | 0 | 1 | 1 | 0 | 0 | 1 | 1 |

FIG. 11

TECHNOLOGIES FOR GENERATING OPTIMIZED EVENT SEQUENCE INDICES FOR REAL-TIME EVENT FLOW VISUALIZATIONS AND ANALYTICS

BACKGROUND

Call centers and other contact centers are used by many organizations to provide technical and other support to their end users. The end user may interact with human and/or virtual agents of the contact center by establishing electronic communications via one or more communication technologies including, for example, telephone, email, web chat, Short Message Service (SMS), dedicated software application(s), and/or other technologies. In particular, the end user may interact with an interactive voice response (IVR) system of the contact center that uses a series of predefined prompts and user responses to determine how to address the user's concerns, for example, by leveraging one or more bot flows defined by a contact center administrator.

SUMMARY

One embodiment is directed to a unique system, components, and methods for generating optimized event sequence indices for real-time event flow visualizations and analytics. Other embodiments are directed to apparatuses, systems, devices, hardware, methods, and combinations thereof for generating optimized event sequence indices for real-time event flow visualizations and analytics.

According to an embodiment, a method for generating an inverted search index for real-time event sequence visualization may include retrieving, by a computing system, an event sequence dataset, wherein the event sequence dataset may include data for a plurality of event sequences and a plurality of events, and wherein each event sequence of the plurality of events sequences may include at least one event of the plurality of events. The method may further include determining, by the computing system, a plurality of event pair combinations based on a plurality of unique singleton events identified from the plurality of events included in the event sequence dataset, and establishing, by the computing system, a positional ordering for each unique singleton event of the plurality of unique singleton events and each event pair combination of the plurality of event pair combinations. The method may also include generating, by the computing system, a respective event sequence set for each event sequence of the plurality of event sequences, determining, by the computing system, whether each unique singleton event of the plurality of unique singleton events and each event pair combination of the plurality of event pair combinations exists or does not exist within each respective event sequence of the plurality of event sequences, and populating, by the computing system, for each respective event sequence set and according to the positional ordering, data indicative of whether each unique singleton event of the plurality of unique singleton events and each event pair combination of the plurality of event pair combinations exists or does not exist within the event sequence for the respective event sequence set. The method may also include generating, by the computing system, the inverted search index including each respective event sequence set for each event sequence of the plurality of event sequences.

In some embodiments, the plurality of event pair combinations may include all possible event pair combinations based on the plurality of unique singleton events identified.

In some embodiments, the method may further include identifying, by the computing system, the plurality of unique singleton events from the plurality of events included in the event sequence dataset.

In some embodiments, the method may further include parsing, by the computing system, the event sequence dataset to identify each event sequence of the plurality of event sequences and each event of the plurality of events.

In some embodiments, the method may further include determining, by the computing system, an occurrence of each event of the plurality of events, and generating, by the computing system, the event sequence dataset including each event of the plurality of events determined to have occurred.

In some embodiments, each event of the plurality of events may be associated with one or more attributes.

In some embodiments, generating the inverted search index may include generating an encoded inverted search index in which each event pattern set is encoded as a bit vector.

According to another embodiment, a system for generating an inverted search index for real-time event sequence visualization may include at least one processor and at least one memory including a plurality of instructions stored thereon that, in response to execution by the at least one processor, causes the system to retrieve an event sequence dataset. In some embodiments, the event sequence dataset includes data for a plurality of event sequences and a plurality of events, and each event sequence of the plurality of events sequences includes at least one event of the plurality of events. In some embodiments, the plurality of instructions may further cause the system to determine a plurality of event pair combinations based on a plurality of unique singleton events identified from the plurality of events included in the event sequence dataset, determine a plurality of event pair combinations based on the plurality of unique singleton events identified, and establish a positional ordering for each unique singleton event of the plurality of unique singleton events and each event pair combination of the plurality of event pair combinations. In some embodiments, the plurality of instructions may also cause the system to generate a respective event sequence set for each event sequence of the plurality of event sequences, determine whether each unique singleton event of the plurality of unique singleton events and each event pair combination of the plurality of event pair combinations exists or does not exist within each event sequence of the plurality of event sequences, and populate, for each respective event sequence set and according to the positional ordering, data indicative of whether each unique singleton event of the plurality of unique singleton events and each event pair combination of the plurality of event pair combinations exists or does not exist within the event sequence for the respective event sequence set. In some embodiments, the plurality of instructions may further cause the system to generate the inverted search index including each respective event sequence set for each event sequence of the plurality of event sequences.

In some embodiments, the plurality of event pair combinations may include all possible event pair combinations based on the plurality of unique singleton events identified.

In some embodiments, the plurality of instructions may further cause the system to identify the plurality of unique singleton events from the plurality of events included in the event sequence dataset.

In some embodiments, the plurality of instructions may further cause the system to determine an occurrence of each event of the plurality of events and generate the event sequence dataset including each event of the plurality of events determined to have occurred.

In some embodiments, to generate the inverted search index may include to generate an encoded inverted search index in which each event pattern set is encoded as a bit vector.

According to yet another embodiment, a method for generating a forward search index for real-time event sequence visualization may include retrieving, by a computing system, an event sequence dataset, wherein the event sequence dataset may include data for a plurality of event sequences and a plurality of events, and wherein each event sequence of the plurality of events sequences includes at least one event of the plurality of events. The method may further include determining, by the computing system, a plurality of unique singleton events from the plurality of events included in the event sequence dataset, determining, by the computing system, a plurality of unique n-tuple event patterns from the plurality of event sequences and the at least one event of the plurality of events included in each of the plurality of event sequences, and generating, by the computing system, an event pattern set for each unique singleton event of the plurality of unique singleton events and each unique n-tuple event pattern of the plurality of unique n-tuple event patterns. The method may also include populating, by the computing system and for each event pattern set, data indicative of an existence of the unique singleton event or the unique n-tuple event pattern in at least one of the plurality of event sequences, and generating, by the computing system, the forward search index including each event pattern set for each unique singleton event of the plurality of unique singleton events and each unique n-tuple event pattern of the plurality of unique n-tuple event patterns.

In some embodiments, each n-tuple event pattern of the plurality of n-tuple event patterns may be an ordered 2-tuple event pattern.

In some embodiments, the method may further include identifying, by the computing system, each event sequence of the plurality of event sequences from the event sequence dataset, and identifying, by the computing system, the plurality of events included in the event sequence dataset.

In some embodiments, the method may further include parsing, by the computing system, the event sequence dataset to identify each event sequence of the plurality of event sequences and each event of the plurality of events.

In some embodiments, the method may further include determining, by the computing system, an occurrence of each event of the plurality of events, and generating, by the computing system, the event sequence dataset including each event of the plurality of events determined to have occurred.

In some embodiments, each event of the plurality of events is associated with one or more attributes.

In some embodiments, generating the forward search index may include generating an encoded forward search index in which each event pattern set for each unique singleton event of the plurality of unique singleton events and each unique n-tuple event pattern of the plurality of unique n-tuple event patterns is encoded as a bit vector.

In some embodiments, generating the encoded forward search index may include establishing, by the computing system, a positional ordering for each event sequence of the plurality of event sequences, and populating, by the computing system and for each event pattern set included in the encoded forward search index, first data or second data according to the positional ordering for each event sequence of the plurality of event sequences, wherein the first data is indicative of the existence of the unique singleton event or the unique n-tuple event pattern in each of the plurality of event sequences, and the second data is indicative of an absence of the unique singleton event or the unique n-tuple event pattern in each of the plurality of event sequences.

This summary is not intended to identify key or essential features of the claimed subject matter, nor is it intended to be used as an aid in limiting the scope of the claimed subject matter. Further embodiments, forms, features, and aspects of the present application shall become apparent from the descriptions and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 6 is a simplified flow diagram of at least one embodiment of a method for generating an inverted index based on event sequence sets;

FIG. 9 is an illustrative visual representation of the exemplary encoded forward index of FIG. 8 depicted in a tabular format;

FIG. 11 is an illustrative visual representation of the exemplary inverted index of FIG. 10 depicted in a tabular format.

DETAILED DESCRIPTION

Figure 1:
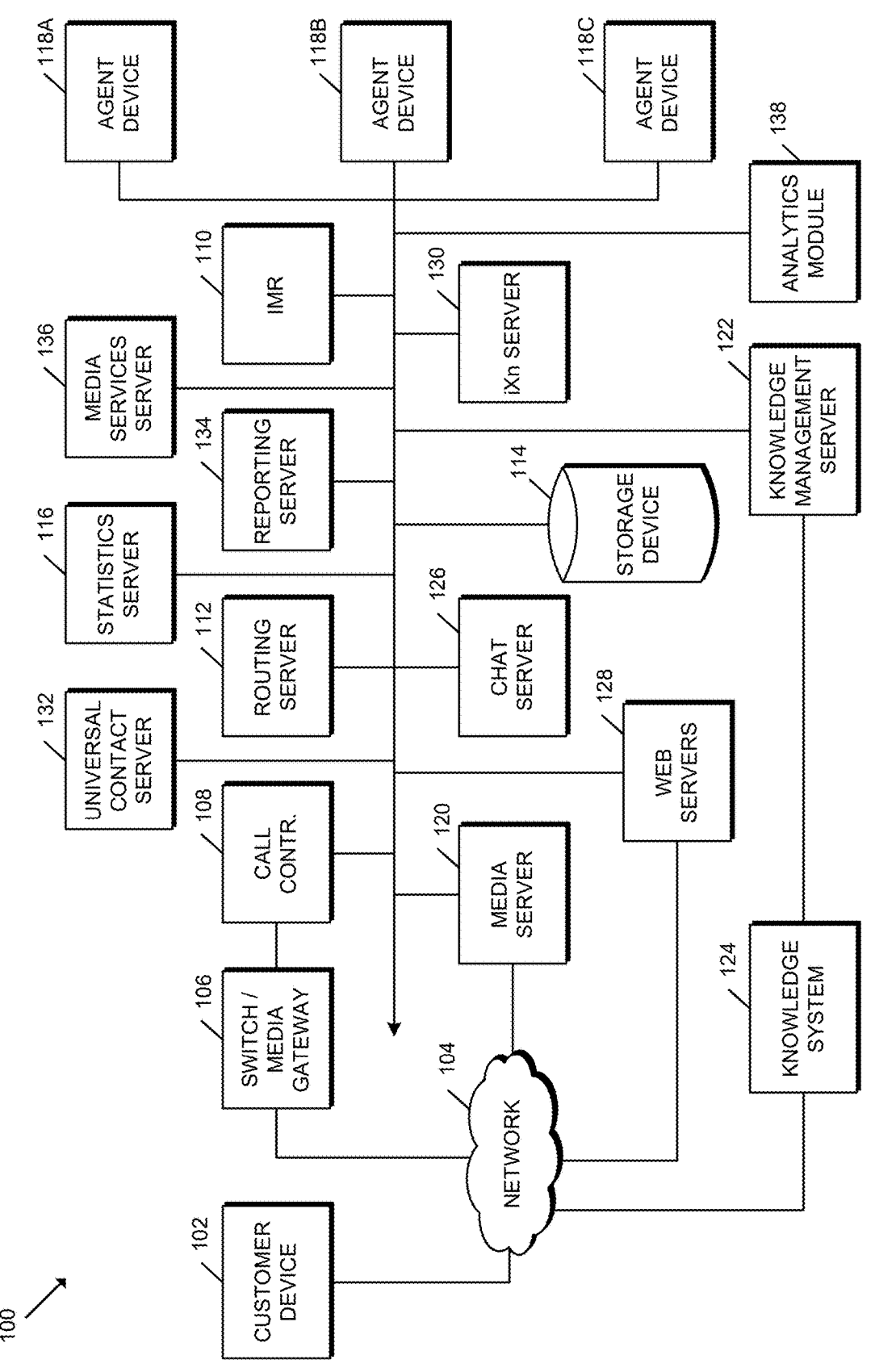
FIG. 1 depicts a simplified block diagram of at least one embodiment of a contact center system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

It should be appreciated that the technologies described below optimize or improve query times associated with user-friendly visualizations utilized by user-experience managers of contact centers to understand flow milestones/outcomes relating to users' interactions with an organization or the products or services provided thereby. More specifically, the illustrative technologies leverage optimized indices and various data structures to allow for the filtering, searching, and/or querying of data to show events in customers' event sequences (e.g., "flows" or "journeys") starting at a particular event, events that include a particular attribute value, and/or events associated with a particular bot flow (e.g., executed by a bot or automated agent of the contact center system). In existing implementations, it is not uncommon for there to exist a large number of events (e.g., millions of events), and each event sequence or journey may contain different numbers and combinations of these events. This leads to queries of events or event sequences having a high time complexity, which results in queries being computationally intensive and may lead to significant scalability issues. Accordingly, the technologies described herein provide for a scalable solution that permits filtering and querying of events and event sequences (e.g., journeys) using optimized indices, resulting in querying and filtering operations having less time complexity than existing implementations. Further, although the technologies are described herein in reference to "event sequences" or "flows," it should be appreciated that similar technologies may be applied to "bot flows," client journeys, or other types of flows in other embodiments.

In context to the embodiments disclosed herein, it should be appreciated that an "event" may be an action occurring at a specific point of time, such as, for example, a user logging into a system, a customer's or an agent's interaction with a bot or chatbot, a user accessing an app or website of an organization, an email being sent or received, an agent's interaction with a user or another agent, a user's purchase of a product or service, a phase of an interactive voice response (IVR) interaction, a web-based event, or steps taken according to a predefined or reference workflow or script. It should be further appreciated that an "event" may be any action that occurs at a specific point of time and is capable of being monitored or logged by the various systems, devices, and components disclosed herein. For example, although some events may represent recorded customer or agent actions, other events may represent changes to static data like updating or creating an address record or assigning demographic or segmentation data. In some embodiments, events may not be associated with a user or client. For instance, changing a product attribute or placing a procurement order could also be events. In some embodiments, one or more events do not contain direct references to other events, but instead can share common actors which indirectly link them together.

In some embodiments, each event may include or otherwise be associated with one or more event attributes. Event attributes may include data or metadata describing characteristics of an event such as, for example, timestamps, event category data, geographic data, event sequence identifiers, enums, or any other type of structured or unstructured data. It should be appreciated that event attributes may include numeric and alphanumeric values. A "story" is a pattern representing a set of events connected by common actors and their relationship in time. An event sequence, "flow," "bot flow," or "journey" is a chronological set of events or actions associated with a single type of actor such as a customer or an agent. Each user may proceed in their own respective event sequence, journey, or flow, each of which may include any number of events.

An event "connection" is a link between two events specifying their shared actor(s) and distance in time. An "event of interest" is an event with metrics that a user desires to analyze. A "story" is a pattern representing a set of events connected by common actors and their relationship in time. A "story query" is a request (e.g., in specialist language) which specifies metrics and story events to gather from the platform data set. In some embodiments, such as those in which story queries are utilized, events may be represented as "nodes" of a graph visualization.

Referring now to FIG. 1, a simplified block diagram of at least one embodiment of a communications infrastructure and/or contact center system, which may be used in conjunction with one or more of the embodiments described herein, is shown. The contact center system 100 may be embodied as any system capable of providing contact center services (e.g., call center services, chat center services, SMS center services, etc.) to an end user and otherwise performing the functions described herein. The illustrative contact center system 100 includes a customer device 102, a network 104, a switch/media gateway 106, a call controller 108, an interactive media response (IMR) server 110, a routing server 112, a storage device 114, a statistics server 116, agent devices 118A, 118B, 118C, a media server 120, a knowledge management server 122, a knowledge system 124, chat server 126, web servers 128, an interaction (iXn) server 130, a universal contact server 132, a reporting server 134, a media services server 136, and an analytics module 138. Although only one customer device 102, one network 104, one switch/media gateway 106, one call controller 108, one IMR server 110, one routing server 112, one storage device 114, one statistics server 116, one media server 120, one knowledge management server 122, one knowledge system 124, one chat server 126, one iXn server 130, one universal contact server 132, one reporting server 134, one media services server 136, and one analytics module 138 are shown in the illustrative embodiment of FIG. 1, the contact center system 100 may include multiple customer devices 102, networks 104, switch/media gateways 106, call controllers 108, IMR servers 110, routing servers 112, storage devices 114, statistics servers 116, media servers 120, knowledge management servers 122, knowledge systems 124, chat servers 126, iXn servers 130, universal contact servers 132, reporting servers 134, media services servers 136, and/or analytics modules 138 in other embodiments. Further, in some embodiments, one or more of the components described herein may be excluded from the system 100, one or more of the components described as being independent may form a portion of another component, and/or one or more of the component described as forming a portion of another component may be independent.

It should be understood that the term "contact center system" is used herein to refer to the system depicted in FIG. 1 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 100), the associated customer service provider (such as a particular customer service provider/agent providing customer services through the contact center system 100), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VOIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots," automated chat modules or "chatbots," and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 100 may be used by a customer service provider to provide various types of services to customers. For example, the contact center system 100 may be used to engage and manage interactions in which automated processes (or bots) or human agents communicate with customers. As should be understood, the contact center system 100 may be an in-house facility to a business or enterprise for performing the functions of sales and customer service relative to products and services available through the enterprise. In another embodiment, the contact center system 100 may be operated by a third-party service provider that contracts to provide services for another organization. Further, the contact center system 100 may be deployed on equipment dedicated to the enterprise or third-party service provider, and/or deployed in a remote computing environment such as, for example, a private or public cloud environment with infrastructure for supporting multiple contact centers for multiple enterprises. The contact center system 100 may include software applications or programs, which may be executed on premises or remotely or some combination thereof. It should further be appreciated that the various components of the contact center system 100 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 200, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 2:
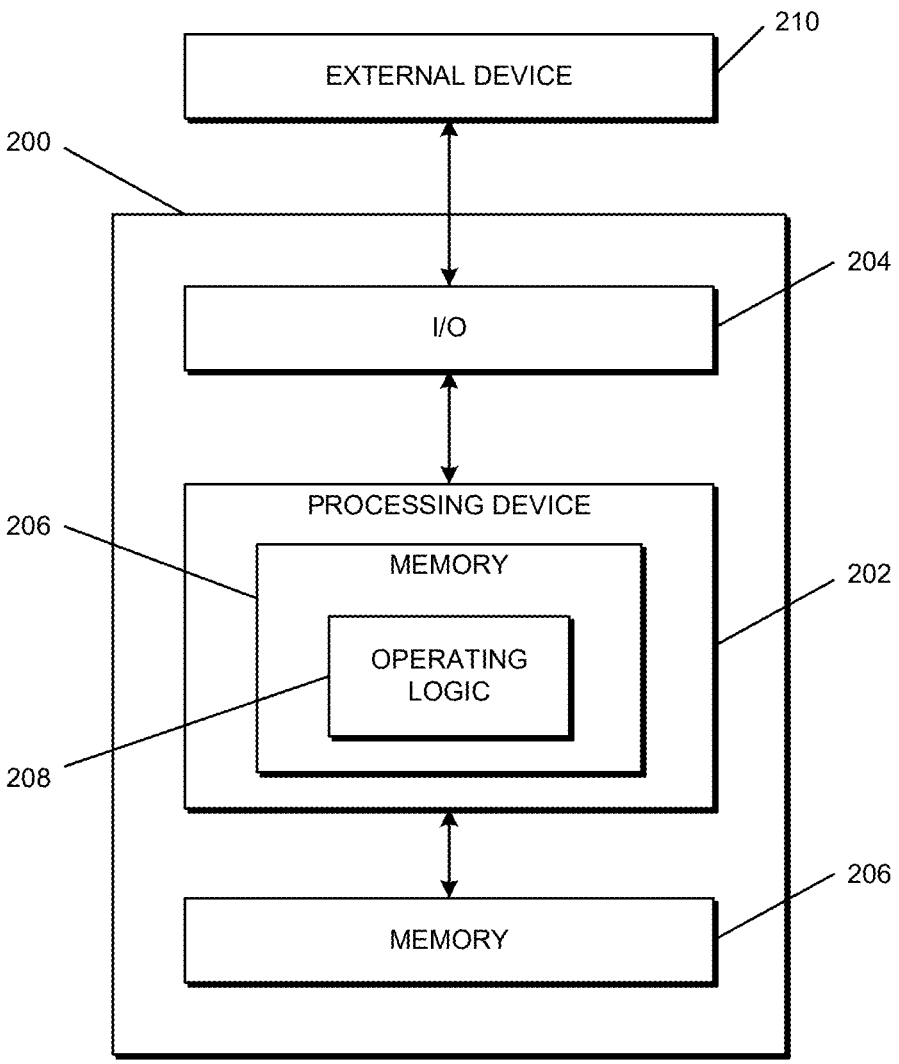
FIG. 2 is a simplified block diagram of at least one embodiment of a computing device.

It should be understood that any of the computer-implemented components, modules, or servers described in relation to FIG. 1 may be implemented via one or more types of computing devices, such as, for example, the computing device 200 of FIG. 2. As will be seen, the contact center system 100 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 100 may initiate inbound communications (e.g., telephone calls, emails, chats, etc.) to the contact center system 100 via a customer device 102. While FIG. 1 shows one such customer device—i.e., customer device 102—it should be understood that any number of customer devices 102 may be present. The customer devices 102, for example, may be a communication device, such as a telephone, smart phone, computer, tablet, or laptop. In accordance with functionality described herein, customers may generally use the customer devices 102 to initiate, manage, and conduct communications with the contact center system 100, such as telephone calls, emails, chats, text messages, web-browsing sessions, and other multi-media transactions.

Inbound and outbound communications from and to the customer devices 102 may traverse the network 104, with the nature of the network typically depending on the type of customer device being used and the form of communication. As an example, the network 104 may include a communication network of telephone, cellular, and/or data services. The network 104 may be a private or public switched telephone network (PSTN), local area network (LAN), private wide area network (WAN), and/or public WAN such as the Internet. Further, the network 104 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 106 may be coupled to the network 104 for receiving and transmitting telephone calls between customers and the contact center system 100. The switch/media gateway 106 may include a telephone or communication switch configured to function as a central switch for agent level routing within the center. The switch may be a hardware switching system or implemented via software. For example, the switch 106 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 118. Thus, in general, the switch/media gateway 106 establishes a voice connection between the customer and the agent by establishing a connection between the customer device 102 and agent device 118.

As further shown, the switch/media gateway 106 may be coupled to the call controller 108 which, for example, serves as an adapter or interface between the switch and the other routing, monitoring, and communication-handling components of the contact center system 100. The call controller 108 may be configured to process PSTN calls, VOIP calls, and/or other types of calls. For example, the call controller 108 may include computer-telephone integration (CTI) software for interfacing with the switch/media gateway and other components. The call controller 108 may include a session initiation protocol (SIP) server for processing SIP calls. The call controller 108 may also extract data about an incoming interaction, such as the customer's telephone number, IP address, or email address, and then communicate these with other contact center components in processing the interaction.

The interactive media response (IMR) server 110 may be configured to enable self-help or virtual assistant functionality. Specifically, the IMR server 110 may be similar to an interactive voice response (IVR) server, except that the IMR server 110 is not restricted to voice and may also cover a variety of media channels. In an example illustrating voice, the IMR server 110 may be configured with an IMR script for querying customers on their needs. For example, a contact center for a bank may instruct customers via the IMR script to "press 1" if they wish to retrieve their account balance. Through continued interaction with the IMR server 110, customers may receive service without needing to speak with an agent. The IMR server 110 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 112 may function to route incoming interactions. For example, once it is determined that an inbound communication should be handled by a human agent, functionality within the routing server 112 may select the most appropriate agent and route the communication thereto. This agent selection may be based on which available agent is best suited for handling the communication. More specifically, the selection of appropriate agent may be based on a routing strategy or algorithm that is implemented by the routing server 112. In doing this, the routing server 112 may query data that is relevant to the incoming interaction, for example, data relating to the particular customer, available agents, and the type of interaction, which, as described herein, may be stored in particular databases. Once the agent is selected, the routing server 112 may interact with the call controller 108 to route (i.e., connect) the incoming interaction to the corresponding agent device 118. As part of this connection, information about the customer may be provided to the selected agent via their agent device 118. This information is intended to enhance the service the agent is able to provide to the customer.

It should be appreciated that the contact center system 100 may include one or more mass storage devices—represented generally by the storage device 114—for storing data in one or more databases relevant to the functioning of the contact center. For example, the storage device 114 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 114 may store agent data in an agent database. Agent data maintained by the contact center system 100 may include, for example, agent availability and agent profiles, schedules, skills, handle time, and/or other relevant data. As another example, the storage device 114 may store interaction data in an interaction database. Interaction data may include, for example, data relating to numerous past interactions between customers and contact centers. More generally, it should be understood that, unless otherwise specified, the storage device 114 may be configured to include databases and/or store data related to any of the types of information described herein, with those databases and/or data being accessible to the other modules or servers of the contact center system 100 in ways that facilitate the functionality described herein. For example, the servers or modules of the contact center system 100 may query such databases to retrieve data stored therein or transmit data thereto for storage. The storage device 114, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 116 may be configured to record and aggregate data relating to the performance and operational aspects of the contact center system 100. Such information may be compiled by the statistics server 116 and made available to other servers and modules, such as the reporting server 134, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 118 of the contact center system 100 may be communication devices configured to interact with the various components and modules of the contact center system 100 in ways that facilitate functionality described herein. An agent device 118, for example, may include a telephone adapted for regular telephone calls or VOIP calls. An agent device 118 may further include a computing device configured to communicate with the servers of the contact center system 100, perform data processing associated with operations, and interface with customers via voice, chat, email, and other multimedia communication mechanisms according to functionality described herein. Although FIG. 1 shows three such agent devices 118—i.e., agent devices

118A, 118B and 118C—it should be understood that any number of agent devices 118 may be present in a particular embodiment.

The multimedia/social media server 120 may be configured to facilitate media interactions (other than voice) with the customer devices 102 and/or the servers 128. Such media interactions may be related, for example, to email, voice mail, chat, video, text-messaging, web, social media, co-browsing, etc. The multimedia/social media server 120 may take the form of any IP router conventional in the art with specialized hardware and software for receiving, processing, and forwarding multi-media events and communications.

The knowledge management server 122 may be configured to facilitate interactions between customers and the knowledge system 124. In general, the knowledge system 124 may be a computer system capable of receiving questions or queries and providing answers in response. The knowledge system 124 may be included as part of the contact center system 100 or operated remotely by a third party. The knowledge system 124 may include an artificially intelligent computer system capable of answering questions posed in natural language by retrieving information from information sources such as encyclopedias, dictionaries, newswire articles, literary works, or other documents submitted to the knowledge system 124 as reference materials. As an example, the knowledge system 124 may be embodied as IBM Watson or a similar system.

The chat server 126 may be configured to conduct, orchestrate, and manage electronic chat communications with customers. In general, the chat server 126 is configured to implement and maintain chat conversations and generate chat transcripts. Such chat communications may be conducted by the chat server 126 in such a way that a customer communicates with automated chatbots, human agents, or both. In exemplary embodiments, the chat server 126 may perform as a chat orchestration server that dispatches chat conversations among the chatbots and available human agents. In such cases, the processing logic of the chat server 126 may be rules driven so to leverage an intelligent workload distribution among available chat resources. The chat server 126 further may implement, manage, and facilitate user interfaces (UIs) associated with the chat feature, including those UIs generated at either the customer device 102 or the agent device 118. The chat server 126 may be configured to transfer chats within a single chat session with a particular customer between automated and human sources such that, for example, a chat session transfers from a chatbot to a human agent or from a human agent to a chatbot. The chat server 126 may also be coupled to the knowledge management server 122 and the knowledge systems 124 for receiving suggestions and answers to queries posed by customers during a chat so that, for example, links to relevant articles can be provided.

The web servers 128 may be included to provide site hosts for a variety of social interaction sites to which customers subscribe, such as Facebook, Twitter, Instagram, etc. Though depicted as part of the contact center system 100, it should be understood that the web servers 128 may be provided by third parties and/or maintained remotely. The web servers 128 may also provide webpages for the enterprise or organization being supported by the contact center system 100. For example, customers may browse the webpages and receive information about the products and services of a particular enterprise. Within such enterprise webpages, mechanisms may be provided for initiating an interaction with the contact center system 100, for example, via web chat, voice, or email. An example of such a mechanism is a widget, which can be deployed on the webpages or websites hosted on the web servers 128. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 130 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 130 may be configured to interact with the routing server 112 for selecting an appropriate agent to handle each of the deferrable activities. Once assigned to a particular agent, the deferrable activity is pushed to that agent so that it appears on the agent device 118 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 118 may include a workbin. As an example, a workbin may be maintained in the buffer memory of the corresponding agent device 118.

The universal contact server (UCS) 132 may be configured to retrieve information stored in the customer database and/or transmit information thereto for storage therein. For example, the UCS 132 may be utilized as part of the chat feature to facilitate maintaining a history on how chats with a particular customer were handled, which then may be used as a reference for how future chats should be handled. More generally, the UCS 132 may be configured to facilitate maintaining a history of customer preferences, such as preferred media channels and best times to contact. To do this, the UCS 132 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 134 may be configured to generate reports from data compiled and aggregated by the statistics server 116 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 136 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), screen recording, speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 138 may be configured to provide systems and methods for performing analytics on data received from a plurality of different data sources as functionality described herein may require. In accordance with example embodiments, the analytics module 138 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 138 may have access to the data stored in the storage device 114, including the customer database and agent database. The analytics module 138 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 138 may be configured to retrieve data stored within the storage device 114 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 138 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 138 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 1 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VOIP calls), emails, vmails, video, chat, screen-sharing, text messages, social media messages, WebRTC calls, etc. Access to and control of the components of the contact center system 100 may be affected through user interfaces (UIs) which may be generated on the customer devices 102 and/or the agent devices 118.

As noted above, in some embodiments, the contact center system 100 may operate as a hybrid system in which some or all components are hosted remotely, such as in a cloud-based or cloud computing environment. It should be appreciated that each of the devices of the contact center system 100 may be embodied as, include, or form a portion of one or more computing devices similar to the computing device 200 described below in reference to FIG. 2.

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 100 of FIG. 1—the various servers and computer devices thereof may be located on local computing devices 200 (e.g., on-site at the same physical location as the agents of the contact center), remote computing devices 200 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device

202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, a different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution that, for example, executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 3:
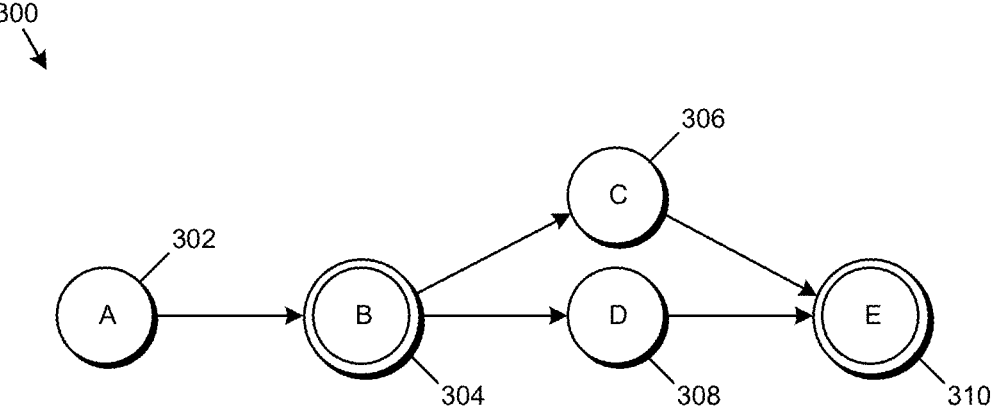
FIG. 3 is an illustrative visual representation of an exemplary pattern of events to be analyzed.

As discussed herein, user-experience managers or other interested users of contact centers may utilize "user-friendly" interactive visualizations to analyze and facilitate understanding of users' interactions with an organization or the products or services provided thereby. To do so, in some embodiments, a graphical user interface (e.g., a flow canvas or a journey canvas) may be provided that allows a user to select and arrange individual nodes (each representing a different event) to construct a "story query" defining one or more sequences of events (or event flows or journeys) to be analyzed. For example, as illustratively shown in FIG. 3, the story query can be represented by a graph visualization 300 in which the nodes of the graph represent individual events (e.g., Event A 302, Event B 304, Event C 306, Event D 308, and Event E 310), and the edges represent one or more users in each event as well as the events' relationship in time (e.g., Event A 302 precedes Event B 304, Event B 304 precedes each of Event C 306 and Event D 308, Event C 306 and Event D 308 each precede Event E 310, etc.). The story query, therefore, may contain one or more sequences of events that are organized in a manner that represents a literal, "human-readable," story that occurred in real life over time. Story queries may contain branches representing alternative event sequences or journeys which converge upon, or diverge from, each other. In some embodiments, such as the one shown in FIG. 3, arrows or other suitable connectors can be used to represent the users that link two events and their relationship in time.

Additionally or alternatively, one or more nodes may be defined as reference nodes. For example, as illustratively shown in FIG. 3, the nodes associated with Event B 304 and Event E 310 are designated as reference nodes. It should be appreciated that in embodiments in which reference nodes are defined, the computing systems described herein (e.g., the contact center system 100, one or more computing devices 200, and/or other computing devices described herein) may be configured to support different operations (e.g., Event A 302 precedes Event B 304, Event C 306 and Event D 308 each follow Event B 304, Event C 306 and Event D 308 each precede Event E 310, etc.) based at least in part on, or otherwise as a function of, the defined reference node(s). Further, in some embodiments, nodes of the graph visualization 300 represent patterns to filter events. That is, nodes 302, 304, 306, 308, 310 of the graph 300 do not represent individual events (i.e., data points) per se. Nodes and edges represent patterns which are used together to find matching occurrences in a dataset and enable aggregation of similar patterns of events and customers.

In operation, a computing system (e.g., the contact center system 100, one or more computing devices 200, and/or other computing devices described herein) may be used to query a dataset containing events and sequences of events (or event flows or journeys) maintained or accessible by the system. For example, in some embodiments, the contact center system 100 or the other computing devices described herein may be configured to generate a count for each of the individual nodes based on the number of individual event sequences stored in the dataset that match the event sequence pattern defined by the story query. As discussed herein, one or more optimized indices (e.g., a forward index, an inverted index, etc.) can be generated and used by the contact center system 100 or the other computing devices to facilitate more efficient querying and filtering of data.

Figure 4:
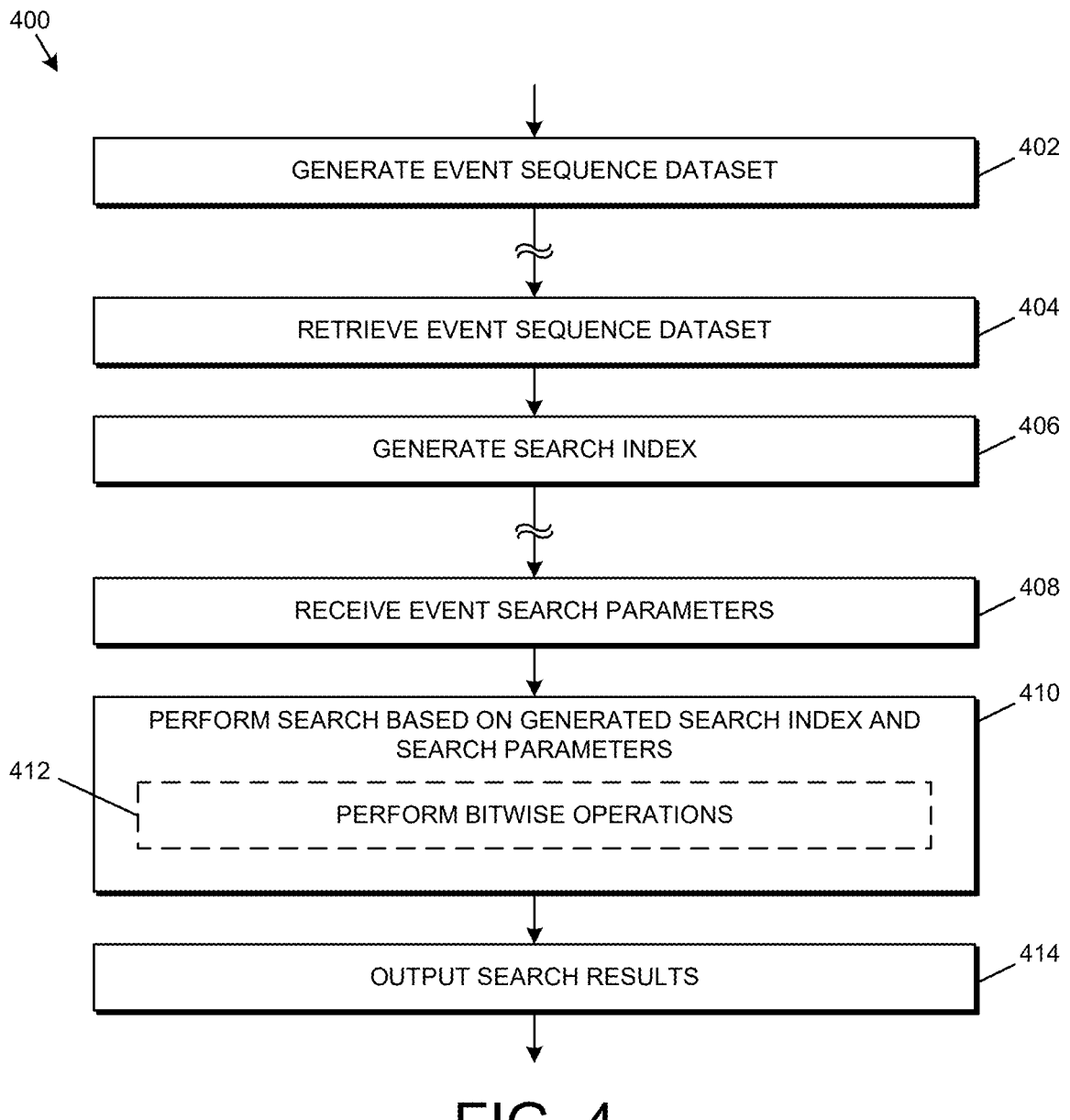
FIG. 4 is a simplified flow diagram of at least one embodiment a method for generating and analyzing events sequence datasets.

Referring now to FIG. 4, in use, a computing system (e.g., the contact center system 100, one or more computing devices 200, and/or other computing devices described herein) may execute a method 400 for generating event sequence datasets. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the computing system generates an event sequence dataset. To do so, in some embodiments, the computing system may identify and record or log the occurrence of discrete events relating customers and/or users and components of the system (e.g., agents, bots, chatbots, etc.). For example, the computing system may identify and log events that occur at a specific point in time such as a user logging into a system, a customer's or an agent's interaction with a bot or chatbot, a user accessing an app or website of an organization, an email being sent or received, an agent's interaction with a customer or another agent, a user's purchase of a product or service, a phase of an interactive voice response (IVR) interaction, a web-based event, or steps taken according to a predefined or reference workflow or script. Additionally or alternatively, the dataset generated by the computing system may include events that represent changes to static data like updating or creating an address record or assigning demographic or segmentation data. Each event included in the dataset generated by the computing system may include one or more attributes such as, a timestamp (e.g., date and time) indicative of the date and time at which the event occurred, data indicative of the event sequence (e.g., event flow or journey) of which the event forms a part, or any other type of structured or unstructured data describing characteristics of the event. In some embodiments, the event sequence dataset is stored in a data storage device of the computing system or remotely (e.g., a cloud storage platform, a remote storage server, etc.).

In block 404, the computing system retrieves the event sequence dataset. In some embodiments, the computing system retrieves all or a portion of the event sequence dataset from a local data storage device. Additionally or alternatively, the computing system retrieves all or a portion of the event sequence dataset from a remote storage location.

In block 406, the computing system generates a search index based on the events and event sequences stored in the event sequence dataset. To do so, the computing system may parse the event sequence dataset to identify the events and event sequences stored therein. In some embodiments, the computing system may parse the event sequence dataset to identify singleton events and patterns of events (e.g., 2-tuple, n-tuple, etc.) for each event sequence stored therein. After parsing the event sequence dataset, the computing system may generate an optimized search index for later real-time event flow visualizations and analytics. In some embodiments, the computing system may execute the method 500 of FIG. 5 to generate a forward search index based on the event pattern sets identified within the event sequence dataset. In other embodiments, the computing system may execute the method 600 of FIG. 6 to generate an inverted search index based on the event sequences identified within the event sequence dataset. The computing system, in some embodiments, may also generate a separate search index for each attribute (e.g., timestamps, time intervals between events, geolocation, categories, etc.) stored in connection with one or more events of the event sequence dataset. In such cases, the indices generated for each attribute may be related to or generated based on the optimized search index for the events and event sequences.

In block 408, the computing system receives event search parameters. In some embodiments, the event search parameters include a story query generated by one or more users. As discussed herein, the story query may contain one or more sequences of events (represented as a timeline of individual event "nodes") that are organized in a manner that represents a literal, "human-readable" story. Additionally, in some embodiments, the computing system may also receive event parameters corresponding to one or more event attributes (e.g., timestamps, time intervals between events, geolocation, categories, etc.) stored in connection with one or more events of the event sequence dataset.

In block 410, the computing system performs a search utilizing the generated search index and the received search parameters. For example, in some embodiments, the computing system searches the generated search index for event sequences having events that chronologically occur in the same order as a story query generated by one or more users. Additionally, in embodiments in which the computing system receives event parameters corresponding to an event attribute, the computing system searches the search index generated for that event attribute. In some embodiments, in block 412, the computing system is configured to utilize the generated search index to perform various bitwise operations (e.g., AND, OR, XOR, NOT) based on the received search parameters.

In block 414, the computing system outputs the search results. For example, in some embodiments, the computing system generates a visual representation of the search results (e.g., a count at each node, a list of matching events or nodes, etc.), which is transmitted to a display for presentation to a user. It should be appreciated that the computing system may output the search results in any format, and such search results may be based on the type of search parameters received.

Although the blocks 402-414 are described in a relatively serial manner, it should be appreciated that various blocks of the method 400 may be performed in parallel in some embodiments.

Figure 5:
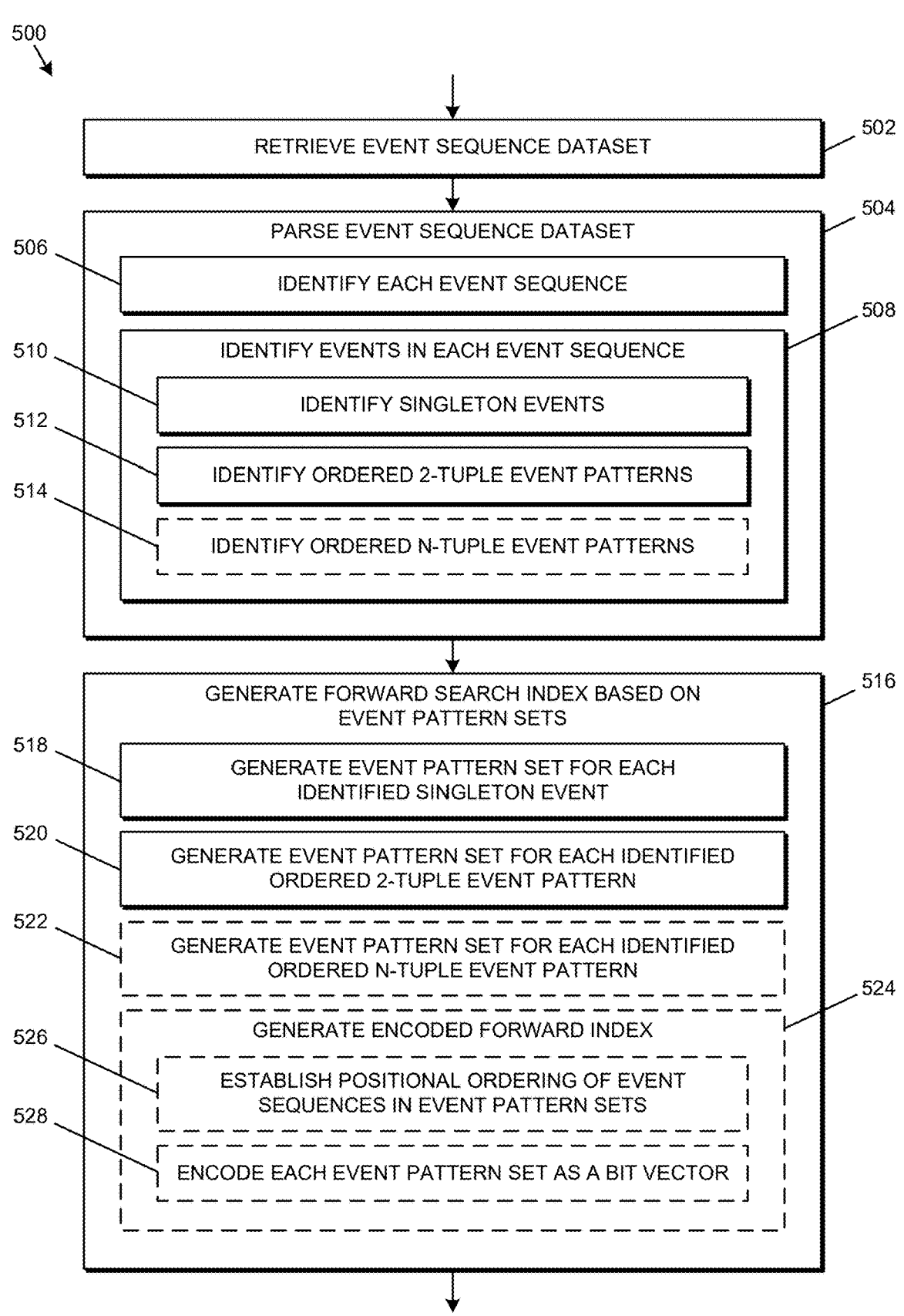
FIG. 5 is a simplified flow diagram of at least one embodiment of a method for generating a forward index based on event pattern sets.

Referring now to FIG. 5, in use, the computing system (e.g., the contact center system 100, one or more computing devices 200, and/or other computing devices described herein) may execute a method 500 for generating a forward index based on event pattern sets identified within an event sequence dataset. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the computing system retrieves an event sequence dataset. In some embodiments, the computing system retrieves all or a portion of the event sequence dataset from a local data storage device. Additionally or alternatively, the computing system retrieves all or a portion of the event sequence dataset from a remote storage location. The event sequence dataset may include data indicative of a plurality of event sequences, and each event sequence includes one or more discrete, chronologically-occurring events relating to the recorded actions of an actor (a customer, an agent, a bot, etc.), as discussed herein. In some embodiments, the event sequence dataset may be the event sequence dataset generated in block 402 of the method 400 of FIG. 4.

Figure 7:
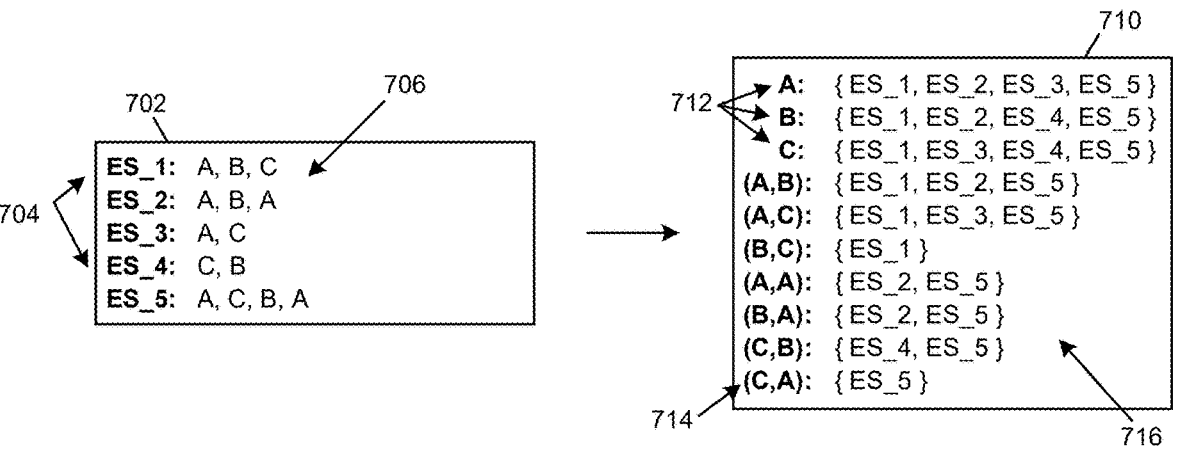
FIG. 7 is an illustrative visual representation of generating an exemplary forward index based on exemplary event pattern sets.

In block 504, the computing system parses the event sequence dataset. In parsing the event sequence dataset, in block 506, the computing system identifies each event sequence contained therein. FIG. 7 illustrates an exemplary event sequence dataset 702 in which the computing system has identified five event sequences 704 (i.e., ES_1-ES_5), with each event sequence 704 including one or more discrete events 706.

Referring back to FIG. 5, in block 508, the computing system also identifies each event contained within each event sequence. To do so, in block 510, the computing system identifies the singleton events included within the event sequence dataset and, more particularly, within each event sequence. As discussed herein, each "event" included within the event sequence dataset may represent a discrete occurrence of a particular type of event by a single actor (e.g., a customer, agent, or bot), in some embodiments. In other embodiments, such as the one described with reference to the method 500 and illustratively shown in FIG. 7, events of the same type (e.g., Events 'A,' 'B,' 'C,' etc.) may be aggregated together to identify similar patterns of events occurring in relation to multiple customers. When individual events of the same type are aggregated together, each aggregated event type may be considered a singleton event (see singleton events 712 of FIG. 7). It should also be appreciated that events only occurring once in an event sequence dataset may also be considered a singleton event.

During parsing operations, the computing system, in block 512, also identifies the ordered 2-tuple event patterns included within each event sequence of the event sequence dataset. That is, the computing system identifies or otherwise determines each distinct chronologically-occurring pair of events within each event sequence dataset. For example, with reference to the exemplary event sequence dataset 702 depicted in FIG. 7, the computing system determines that first event sequence (i.e., ES_1) includes three chronologically-occurring pairs of events (i.e., (A,B), (A,C), and (B,C)). It should be appreciated that chronologically occurring event sequence pairs of the same type may be aggregated together, and each aggregated event sequence pair may be considered a single ordered 2-tuple event pattern (see event patterns 714 of FIG. 7). In some embodiments, in block 514, the computing system may identify the ordered n-tuple event patterns included within each event sequence of the event sequence dataset. That is, the computing system is not limited to identifying singletons and 2-tuple event patterns, and in some embodiments, the computing system may identify event patterns of any length.

It should be appreciated that although the identification of singleton events (see block 510), the identification of ordered 2-tuple event patterns (see block 512), and the identification of n-tuple event patterns (see block 514) are illustratively depicted in FIG. 5 as being part of the parsing operations (see block 504), any number of those blocks may be performed by the computing system outside of block 504.

In block 516, the computing system generates a forward search index (see index 710 of FIG. 7) based on event pattern sets. To do so, in block 518, the computing system generates an event pattern set for each singleton event (see singleton events 712 of FIG. 7) identified within each event sequence (see event sequences 704 of FIG. 7) of the event sequence dataset. Additionally, in block 520, the computing system generates an event pattern set for each ordered 2-tuple event pattern (see event patterns 714 of FIG. 7) identified within each event sequence (see event sequences 704 of FIG. 7) of the event sequence dataset. In embodiments in which the computing system identifies ordered n-tuple event patterns included within each event sequence, the computing system may, in block 522, generate an event pattern set for each identified ordered n-tuple event pattern. Referring back to block 516, the forward index (see index 710 of FIG. 7) generated by the computing system therefore includes an event pattern set for each identified singleton (see singleton events 712 of FIG. 7) and each identified ordered 2-tuple/n-tuple event pattern (see event patterns 714 of FIG. 7). In addition to generating the singleton event pattern sets and ordered 2-tuple/n-tuple event pattern sets for the generated forward search index, the computing system also populates, within each of those pattern sets, an identification of the specific event sequence(s) that contain the singleton event pattern or ordered 2-tuple/n-tuple event pattern (see containing event sequences 716 of FIG. 7).

Figure 8:
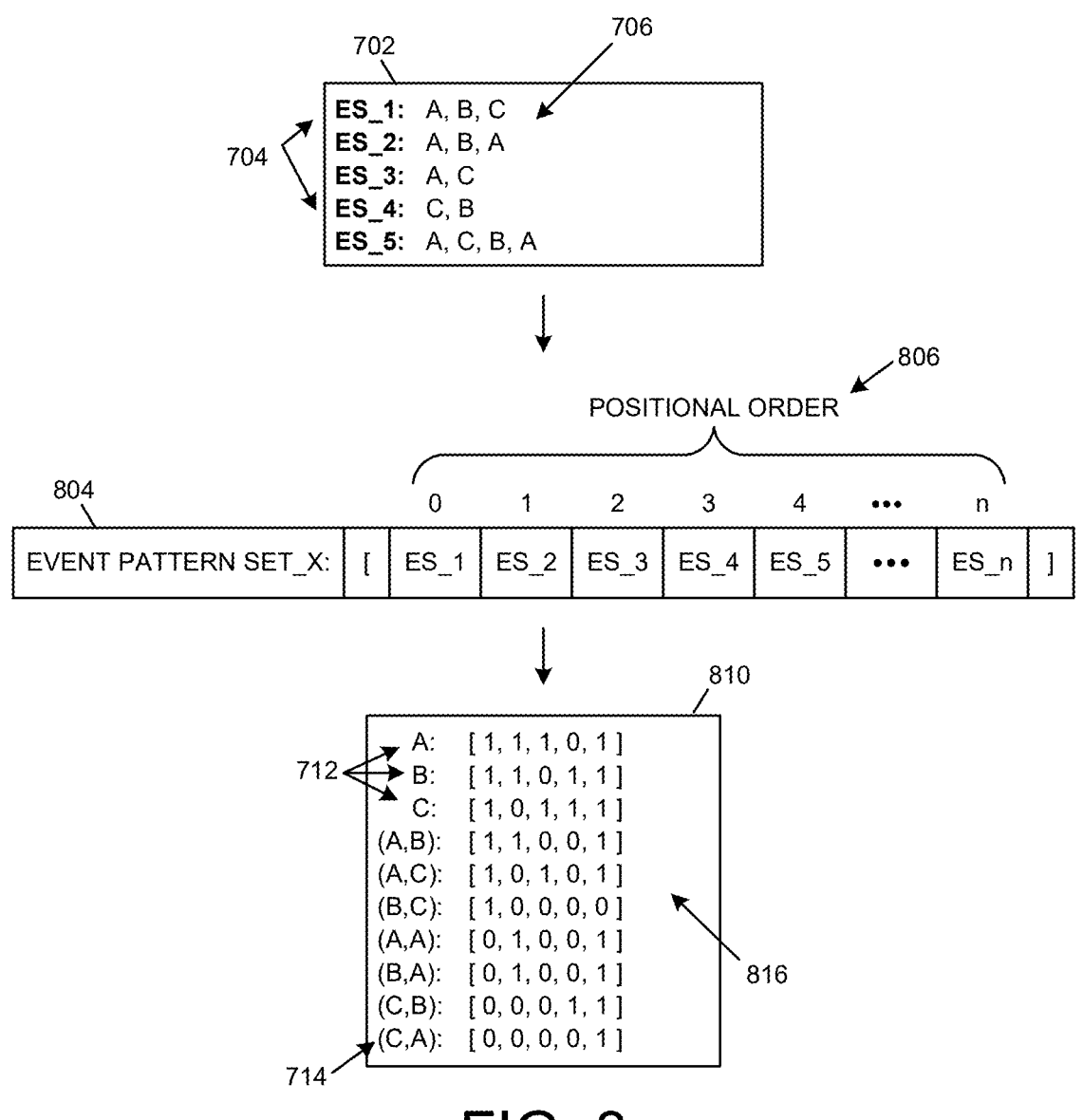
FIG. 8 is an illustrative visual representation of generating an exemplary encoded forward index with bit vectors based on exemplary event pattern sets.

In some embodiments, in block 524, the computing system may generate an encoded forward index in which each event pattern set included in the forward index is encoded. FIG. 8 visually illustrates the generation of an exemplary encoded forward index 810 and will be referenced in the following discussion of blocks 524-528 to facilitate understanding of the underlying principles of those blocks. In embodiments in which encoding is used to generate the forward index, the computing system may establish, in block 526, a positional ordering (see positional orders 806) for each event sequence to be included in each of the event pattern sets. In doing so, the computing system may, in some embodiments, utilize a reference event pattern set template (see event pattern set template 804) that defines the specific format that each event pattern set of the forward index should appear, including the specific order that each event sequence should appear. It should be appreciated that the computing system may, in some embodiments, assign a specific order to all event sequences identified within the event sequence dataset. In such embodiments, each event pattern set (e.g., singleton event pattern sets, ordered 2-tuple event pattern sets, etc.) generated for the encoded forward index 810 will include data indicative of all event sequences and not just those specific event sequences associated with a particular event pattern set.

After establishing the positional ordering of all event sequences, the computing system may, in block 528, encode each event pattern set as a bit vector including '1s' and '0s' (see bit vectors 816 of FIG. 8), where a '1' indicates that the particular event pattern set occurs within a specific event sequence (as defined by the order), and a '0' indicates that the particular event pattern set does not occur within the specific event sequence (as defined by the order). It should be appreciated that in other embodiments, a '0' may be used to indicate that a particular event pattern set occurs within a specific event sequence (as defined by the order), and a '1' may be used to indicate that that a particular event pattern set does not occur within a specific event sequence (as defined by the order). FIG. 9 is an illustrative visual representation of the exemplary encoded forward index 810 of FIG. 8 depicted in a tabular format 910. It should be appreciated that by encoding each event pattern set, storage usage may be compacted and significantly less system memory is required compared to other data structures such as arrays of integers or Booleans. Furthermore, the encoding technologies described herein support random access, and are highly efficient for bitwise operations (AND, OR, XOR, NOT), which can be performed directly on the entire vector.

Although the blocks 502-528 are described in a relatively serial manner, it should be appreciated that various blocks of the method 500 may be performed in parallel in some embodiments.

Referring now to FIG. 6, in use, the computing system (e.g., the contact center system 100, one or more computing devices 200, and/or other computing devices described herein) may execute a method 600 for generating an encoded inverted index based on event sequences identified within an event sequence dataset. It should be appreciated that the particular blocks of the method 600 are illustrated by way of example, and such blocks may be combined or divided, added or removed, and/or reordered in whole or in part depending on the particular embodiment, unless stated to the contrary.

The illustrative method 600 begins with block 602 in which the computing system retrieves an event sequence dataset. In some embodiments, the computing system retrieves all or a portion of the event sequence dataset from a local data storage device. Additionally or alternatively, the computing system retrieves all or a portion of the event sequence dataset from a remote storage location. The event sequence dataset may include data indicative of a plurality of event sequences, and each event sequence includes one or more discrete, chronologically-occurring events relating to the recorded actions of an actor (a customer, an agent, a bot, etc.), as discussed herein. In some embodiments, the event sequence dataset may be the event sequence dataset generated in block 402 of the method 400 of FIG. 4.

Figure 10:
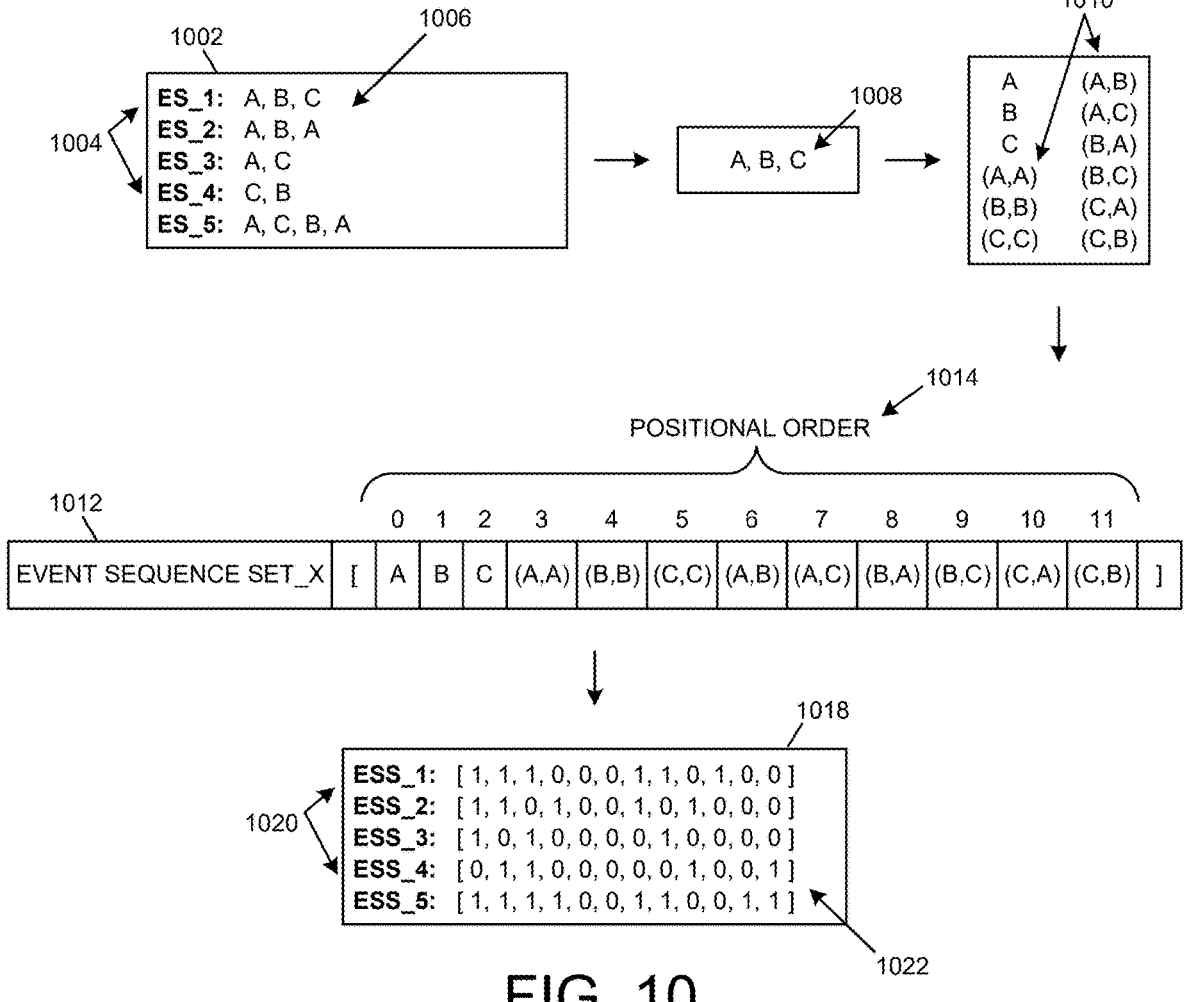
FIG. 10 is an illustrative visual representation of generating an exemplary inverted index with bit vectors based on exemplary event sequences.

In block 604, the computing system parses the event sequence dataset. In parsing the event sequence dataset, in block 606, the computing system identifies each event sequence contained therein. FIG. 10 illustrates an exemplary event sequence dataset 1002 in which the computing system has identified five event sequences 1004 (i.e., ES_1-ES_5), with each event sequence 1004 including one or more discrete events 1006.

Referring back to FIG. 6, in block 608, the computing system identifies or determines each singleton event included within the event sequence dataset (see singleton events 1008 of FIG. 10). To do so, in some embodiments, the computing system may identify each discrete event (see events 1008 of FIG. 10) contained within the event sequence dataset and, more particularly, within each event sequence (see event sequences 1004 of FIG. 10). As discussed herein, each "event" included within the event sequence dataset may represent a discrete occurrence of a particular type of event by a single actor (e.g., a customer, agent, or bot), in some embodiments. In other embodiments, such as the one described with reference to the method 600 and illustratively shown in FIG. 10, events of the same type (e.g., Events 'A,' 'B,' 'C,' etc.) may be aggregated together to identify similar patterns of events occurring in relation to multiple customers. When individual events of the same type are aggregated together, each aggregated event type may be considered a singleton event (see singleton events 1008 of FIG. 10). It should also be appreciated that events only occurring once in an event sequence dataset may also be considered a singleton event.

During parsing operations, the computing system, in block 610, also determines or identifies all possible event pair combinations based on the identified singleton events. For example, as illustratively shown in FIG. 10, the computing system may identify three singleton events 1008 (i.e., Events 'A,' 'B,' and 'C') from the event sequence dataset 1002. Based on those three singleton events, the computing system may determine that nine event pair combinations 1010 are possible (i.e., (A,A), (B,B), (C,C), (A,B), (A,C), (B,A), (B,C), (C,A), and (C,B)). In some embodiments, in block 612, the computing system may determine all possible event n-combinations based on the identified singleton events. That is, the computing system is not limited to identifying singleton events and event pair combinations, and in some embodiments, the computing system may identify event combinations of any length.

In block 614, the computing system determines, for each event sequence identified from the event sequence dataset, whether each identified singleton event and event pair combination (or event n-combination) exists or is absent. It should be appreciated the presence or absence of a singleton event and/or event pair combination within a particular event sequence is indicative of whether or not that singleton event or and/or event pair combination occurred with that particular event sequence.

In block 616, the computing system generates an encoded inverted search index (see index 1018 of FIG. 10) based on the event sequences identified from the event sequence dataset. To do so, in block 618, the computing system generates a respective event sequence set (see event sequence sets 1020 of FIG. 10) for each event sequence identified from the event sequence dataset based on the determination of whether each identified singleton event and event pair combination exists or is absent within a particular event sequence. In embodiments in which the computing system determines all possible event n-combinations based on the identified singleton events, the computing system may, in block 620, generate an event sequence set for each event sequence identified from the event sequence dataset based on the determination of whether each identified singleton event and event n-combination exists or is absent. As discussed below, each event sequence set included within the encoded inverted search index may include data indicative of whether each singleton and event pair combination (or event n-combination) exists or is absence within that particular event sequence.

In block 624, the computing system establishes a positional ordering (see positional orders 1014 of FIG. 10) for each singleton event and event pair combination (or n-combination) within each respective event sequence set. To do so, the computing system may, in some embodiments, utilize a reference event pattern set template (see event sequence set template 1012 of FIG. 10) that defines the specific format that each event sequence set of the encoded inverted index should appear, including the specific order that the data indicative of the presence of absence of each possible singleton event and event pair combination (or n-combination) should appear.

After establishing the positional ordering of all event sequences, the computing system, in block 626, encodes each event sequence set as bit vector including '1s' and '0s' (see bit vectors 1022 of FIG. 10), where a '1' indicates that a particular singleton event or event pair combination (as defined by the order) occurs within a particular event sequence, a '0' indicates that the particular singleton event or event pair combination (as defined by the order) does not occur within the particular event sequence. It should be appreciated that in other embodiments, a '0' may be used to indicate that the particular singleton event or event pair combination (as defined by the order) occurs within a particular event sequence, and a '1' may be used to indicate that the particular singleton event or event pair combination (as defined by the order) does not occur within a particular event sequence. FIG. 11 is an illustrative visual representation of the exemplary encoded inverted index 1018 of FIG. 10 depicted in a tabular format 1110. It should be appreciated that by encoding each event sequence set, storage usage may be compacted and significantly less system memory is required compared to other data structures such as arrays of integers or Booleans. Furthermore, the encoding technologies described herein support random access, and are highly efficient for bitwise operations (AND, OR, XOR, NOT), which can be performed directly on the entire vector.

Although the blocks 602-626 are described in a relatively serial manner, it should be appreciated that various blocks of the method 600 may be performed in parallel or in a different order, in some embodiments.

What is claimed is:

1. A method for generating a forward search index for real-time event sequence visualization, the method comprising:

retrieving, by a computing system, an event sequence dataset, wherein the event sequence dataset includes data for a plurality of event sequences and a plurality of events, and wherein each event sequence of the plurality of events sequences includes at least one event of the plurality of events;

determining, by the computing system, a plurality of unique singleton events from the plurality of events included in the event sequence dataset;

determining, by the computing system, a plurality of unique n-tuple event patterns from the plurality of event sequences and the at least one event of the plurality of events included in each of the plurality of event sequences;

generating, by the computing system, an event pattern set for each unique singleton event of the plurality of unique singleton events and each unique n-tuple event pattern of the plurality of unique n-tuple event patterns; populating, by the computing system and for each event pattern set, data indicative of an existence of the unique singleton event or the unique n-tuple event pattern in at least one of the plurality of event sequences; and generating, by the computing system, the forward search index including each event pattern set for each unique singleton event of the plurality of unique singleton events and each unique n-tuple event pattern of the plurality of unique n-tuple event patterns.

2. The method of claim 1, wherein each n-tuple event pattern of the plurality of n-tuple event patterns is an ordered 2-tuple event pattern.

3. The method of claim 1, further comprising:

identifying, by the computing system, each event sequence of the plurality of event sequences from the event sequence dataset; and identifying, by the computing system, the plurality of events included in the event sequence dataset.

4. The method of claim 1, further comprising parsing, by the computing system, the event sequence dataset to identify each event sequence of the plurality of event sequences and each event of the plurality of events.

5. The method of claim 1, further comprising:

determining, by the computing system, an occurrence of each event of the plurality of events; and generating, by the computing system, the event sequence dataset including each event of the plurality of events determined to have occurred.

6. The method of claim 1, wherein each event of the plurality of events is associated with one or more attributes.

7. The method of claim 1, wherein generating the forward search index comprises generating an encoded forward search index in which each event pattern set for each unique singleton event of the plurality of unique singleton events and each unique n-tuple event pattern of the plurality of unique n-tuple event patterns is encoded as a bit vector.

8. The method of claim 7, wherein generating the encoded forward search index comprises:

establishing, by the computing system, a positional ordering for each event sequence of the plurality of event sequences; and populating, by the computing system and for each event pattern set included in the encoded forward search index, first data or second data according to the positional ordering for each event sequence of the plurality of event sequences, wherein the first data is indicative of the existence of the unique singleton event or the unique n-tuple event pattern in each of the plurality of event sequences, and the second data is indicative of an absence of the unique singleton event or the unique n-tuple event pattern in each of the plurality of event sequences.

* * * * *